(12) United States Patent
Labbé

(10) Patent No.: US 8,894,520 B2
(45) Date of Patent: Nov. 25, 2014

(54) DRIVEN PULLEY FOR A CONTINUOUSLY VARIABLE TRANSMISSION

(75) Inventor: Jocelyn Labbé, St-Germain-de-Grantham (CA)

(73) Assignee: CVTech Inc., Drummondville (CA)

( * ) Notice: Subject to any disclaimer, the term of this patent is extended or adjusted under 35 U.S.C. 154(b) by 780 days.

(21) Appl. No.: 12/663,646

(22) PCT Filed: Jun. 6, 2008

(86) PCT No.: PCT/CA2008/001085
§ 371 (c)(1),
(2), (4) Date: Dec. 8, 2009

(87) PCT Pub. No.: WO2008/148208
PCT Pub. Date: Dec. 11, 2008

(65) Prior Publication Data
US 2010/0167852 A1    Jul. 1, 2010

Related U.S. Application Data

(60) Provisional application No. 60/942,774, filed on Jun. 8, 2007.

(51) Int. Cl.
| | |
|---|---|
| F16H 59/00 | (2006.01) |
| F16H 61/00 | (2006.01) |
| F16H 63/00 | (2006.01) |
| F16H 55/56 | (2006.01) |
| F16H 63/06 | (2006.01) |
| F16H 61/662 | (2006.01) |

(52) U.S. Cl.
CPC .............. *F16H 55/56* (2013.01); *F16H 63/067* (2013.01); *F16H 61/66272* (2013.01)

USPC .......................................................... 474/19

(58) Field of Classification Search
USPC .......................................................... 474/19
See application file for complete search history.

(56) References Cited

U.S. PATENT DOCUMENTS 3,800,608 A * 4/1974 Bessette .......................... 474/14
5,967,286 A * 10/1999 Hokanson et al. ......... 192/110 R
(Continued)

FOREIGN PATENT DOCUMENTS

| CA | 2493455 | 7/2005 |
| CA | 2578950 | 3/2006 |

OTHER PUBLICATIONS

International Search Report and Written Opinion dated Nov. 12, 2008 for Corresponding PCT Application No. PCT/CA2008/001085, 9 pgs.

(Continued)

*Primary Examiner* — Henry Liu
(74) *Attorney, Agent, or Firm* — Marshall, Gerstein & Borun LLP

(57) ABSTRACT

The driven pulley is part of a continuously-variable transmission (CVT). The driven pulley comprises two coaxially-disposed sheaves defining between them a belt-receiving groove. It also has at least two axisymmetric ramp surfaces attached to one of the sheaves and at least two axisymmetric followers attached to the other sheave, each ramp surface being engageable by a corresponding one of the followers. At least some of the ramp surfaces are provided on corresponding ramp holders that are independent from the sheaves. A method of modifying the settings of a driven pulley and a method of assembling a driven pulley also disclosed.

18 Claims, 7 Drawing Sheets

(56) References Cited

U.S. PATENT DOCUMENTS

| | | | | |
|---|---|---|---|---|
| 6,502,479 | B1* | 1/2003 | Lee | 74/568 R |
| 6,743,129 | B1* | 6/2004 | Younggren et al. | 474/19 |
| 6,758,197 | B2 | 7/2004 | Korenjak et al. | |
| 6,949,039 | B2 | 9/2005 | Labbé | |
| 6,997,833 | B2* | 2/2006 | Labbe | 474/19 |
| 7,037,226 | B2* | 5/2006 | Zulawski | 474/19 |
| 7,081,057 | B2 | 7/2006 | Kalies | |
| 7,674,197 | B2* | 3/2010 | Aitcin | 474/19 |
| 7,927,241 | B2* | 4/2011 | Labbe | 474/19 |
| 2002/0065156 | A1* | 5/2002 | Younggren et al. | 474/19 |
| 2004/0185974 | A1* | 9/2004 | Labbe | 474/19 |
| 2004/0266570 | A1* | 12/2004 | Kalies | 474/19 |
| 2005/0209032 | A1* | 9/2005 | Aitcin | 474/19 |
| 2009/0042678 | A1 | 2/2009 | Labbé | |
| 2009/0048046 | A1* | 2/2009 | Jocelyn | 474/13 |

OTHER PUBLICATIONS

International Preliminary Report on Patentability dated Oct. 14, 2009 for Corresponding PCT Application No. PCT/CA/2008/001085.

* cited by examiner

DRIVEN PULLEY FOR A CONTINUOUSLY VARIABLE TRANSMISSION

Continuously variable transmissions (CVTs) are commonly used on a wide range of vehicles, such as small cars or trucks, snowmobiles, golf carts, scooters, etc. They often comprise a driving pulley mechanically connected to a motor, a driven pulley mechanically connected to wheels or a track, possibly through another mechanical device such as a gearbox, and a trapezoidal drivebelt transmitting torque between the driving pulley and the driven pulley. A CVT automatically changes the ratio as required by load and speed conditions, providing a high torque under high loads at low speeds and yet controlling the rotation speed of the motor as the vehicle accelerates. A CVT may be used with all kinds of motors, such as internal combustion engines or electric motors.

The sides of the drivebelt are, on each pulley, gripped between the walls of two opposite and coaxially-mounted sheaves. One sheave, sometimes called "fixed sheave", can be rigidly connected to one end of a supporting shaft while the other sheave, sometimes called "movable sheave", can be free to slide and/or rotate with reference to the fixed sheave by means of bushings or the like. The relative position of the sheaves changes the winding diameter of the drivebelt on each pulley.

At a low vehicle speed, the winding diameter of the drivebelt at the driving pulley is minimal and the winding diameter at the driven pulley is maximal. This is referred to as the minimum ratio since there is the minimum number of rotations or fraction of rotation of the driven pulley for each full rotation of the driving pulley.

Generally, when the rotation speed of the driving pulley increases, its movable sheave moves closer to the fixed sheave thereof under the effect of a control mechanism, for instance a centrifugal mechanism. This constrains the drivebelt to wind on a larger diameter at the driving pulley. The drivebelt then exerts a radial force on the sheaves of the driven pulley in addition to the tangential driving force by which the torque received from the motor is transmitted. This radial force urges the movable sheave of the driven pulley away from the fixed sheave thereof, thereby constraining the drivebelt to wind on a smaller diameter at the driven pulley. The radial force is often counterbalanced by a return force, for instance a return force generated by a spring of the driven pulley and/or by another biasing mechanism. It may also be counterbalanced by a force generated by the axial reaction of the torque applied by the drivebelt on the driven pulley, which force often results from the presence of a cam system and/or another biasing mechanism that tend(s) to move the movable sheave towards the fixed sheave as the torque increases. A cam system may comprise a plurality of ramp surfaces on which respective followers can be engaged. The followers can be sliding buttons or rollers, for instance. The set of ramp surfaces or the set of followers is attached to the movable sheave. The other set is directly or indirectly attached to the fixed sheave and is in a torque-transmitting engagement with the main shaft supporting the driven pulley. The closing effect of the cam system on the drivebelt tension is then somewhat proportional to the torque received from the motor.

Generally, at the maximum vehicle speed, the ratio is maximum as there is the maximum number of rotations or fraction of rotation of the driven pulley for each full rotation of the driving pulley.

When the vehicle speed decreases, the rotation speed of the driving pulley eventually decreases as well since the rotation speed of the motor will decrease at one point. Ultimately, this causes a decrease of the winding diameter at the driving pulley and a decrease of the radial force exerted by the drivebelt on the sheaves of the driven pulley. The driven pulley is then allowed to have a larger winding diameter as the spring and/or another biasing mechanism move(s) its movable sheave closer the fixed sheave.

Some CVTs are provided with a "reversible" driven pulley. A reversible driven pulley is not limited to only provide control in a "forward mode" and operates in a similar fashion than one that is not, with the exception that the transmission ratio can be controlled during motor braking when the vehicle travels in a forward direction, or be controlled when the vehicle accelerates in a backward direction and the direction of the torque received from the motor is changed. These instances are generically referred to as the "motor braking mode" and the "reverse mode", respectively. A reversible driven pulley comprises a second set of ramp surfaces and sometimes a second set of followers if the first set of followers is not designed to be used with the second set of ramp surfaces. The first set of ramp surfaces is used when the torque received from the motor is in one direction (forward mode), and the second set of ramp surfaces is used during a motor braking mode or when the torque received from the motor is in the opposite direction (reverse mode).

During the motor braking mode, the torque is no longer coming from the motor to the wheels or track of the vehicle, but in the opposite direction. In the reverse mode, the vehicle accelerates backwards by changing the direction of the torque received from the motor delivered at the CVT, as aforesaid. Various arrangements can be used to change the direction of the torque and bring the CVT in the reverse mode. For instance, if the vehicle is driven by an electric motor, the electric motor can be a bidirectional motor. In the case of an internal combustion engine, it is also possible to change the direction of rotation using an electric controller capable of selecting in which direction the engine rotates. Another possible approach is to use a gearbox capable of selectively reversing the direction of its output torque, which output torque is then delivered to the CVT.

It is worth mentioning that there is possibly a motor braking mode when the vehicle travels in a backward direction. However, given the fact that most vehicles travel backwards only on very short distances, such mode is rarely considered in the design of a driven pulley. Nevertheless, a designer may choose to design a driven pulley with such mode.

U.S. Pat. No. 6,949,039 issued 25 Sep. 2005 shows an example of a reversible driven pulley. The driven pulley described therein provides many advantages in terms of overall weight reduction and compactness. Nevertheless, there is still room for further improvements, including some to further simplify the construction and/or the modifications of a driven pulley.

In one aspect, there is provided a driven pulley for a continuously-variable transmission (CVT), the driven pulley having a rotation axis and comprising two coaxially-disposed sheaves defining between them a belt-receiving groove, the driven pulley having at least two axisymmetric ramp surfaces attached to one of the sheaves and at least two axisymmetric followers attached to the other sheave, each ramp surface being engageable by a corresponding one of the followers. The driven pulley is characterized in that at least two of the ramp surfaces are each provided on a separate ramp holder, the ramp holders being individually connected to said one of the sheaves and being disposed within a same radial plane.

In another aspect, there is provided a method of modifying settings of a driven pulley of a continuously-variable transmission (CVT), the method comprising: removing a plurality of ramp holders that are each separately connected to a sheave of the driven pulley; and then inserting a plurality of new individual ramp holders into the sheave of the driven pulley and connecting them to the sheave, the new ramp holders having ramp surfaces that are different in shape compared to ramp surfaces they replace.

In another aspect, there is provided a method of assembling a driven pulley of a continuously variable transmission (CVT), the method comprising: selecting one among a plurality of alternative models of helical ramp surfaces designed to be mounted into the driven pulley; and then connecting to the driven pulley a plurality of individual ramp holders on which are provided the ramp surfaces of the selected one among the plurality of the alternative models of helical ramp surfaces, the ramp holders with the selected ramp surface model being each independently connected to the driven pulley.

The improved driven pulley will now be described in the following detailed description of an example thereof, which description is made in conjunction with the accompanying figures in which.

Figure 1:
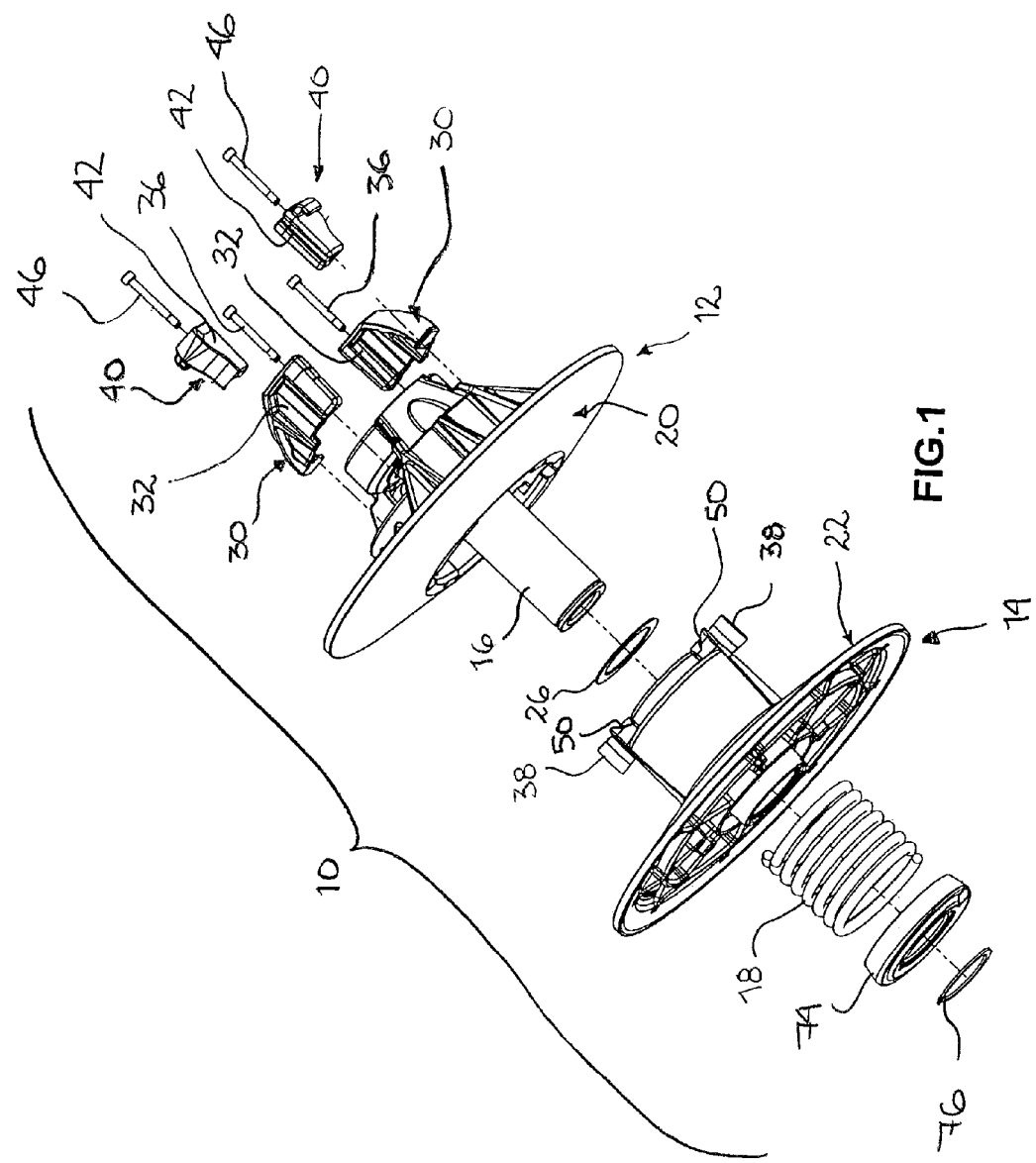
FIG. 1 is a partially exploded isometric view of an example of a driven pulley as improved.

FIG. 1 shows an example of a driven pulley 10 as improved. This illustrated driven pulley 10 is only one example among many possible designs and arrangements. The driven pulley 10 is part of a continuously variable transmission (CVT) of a vehicle. Generally, single parts of the driven pulley 10 are coaxially mounted around its rotation axis and multiples of a same part are axisymmetric (i.e. symmetrically disposed around its rotation axis) in order to have a properly-balanced device.

Figure 8:
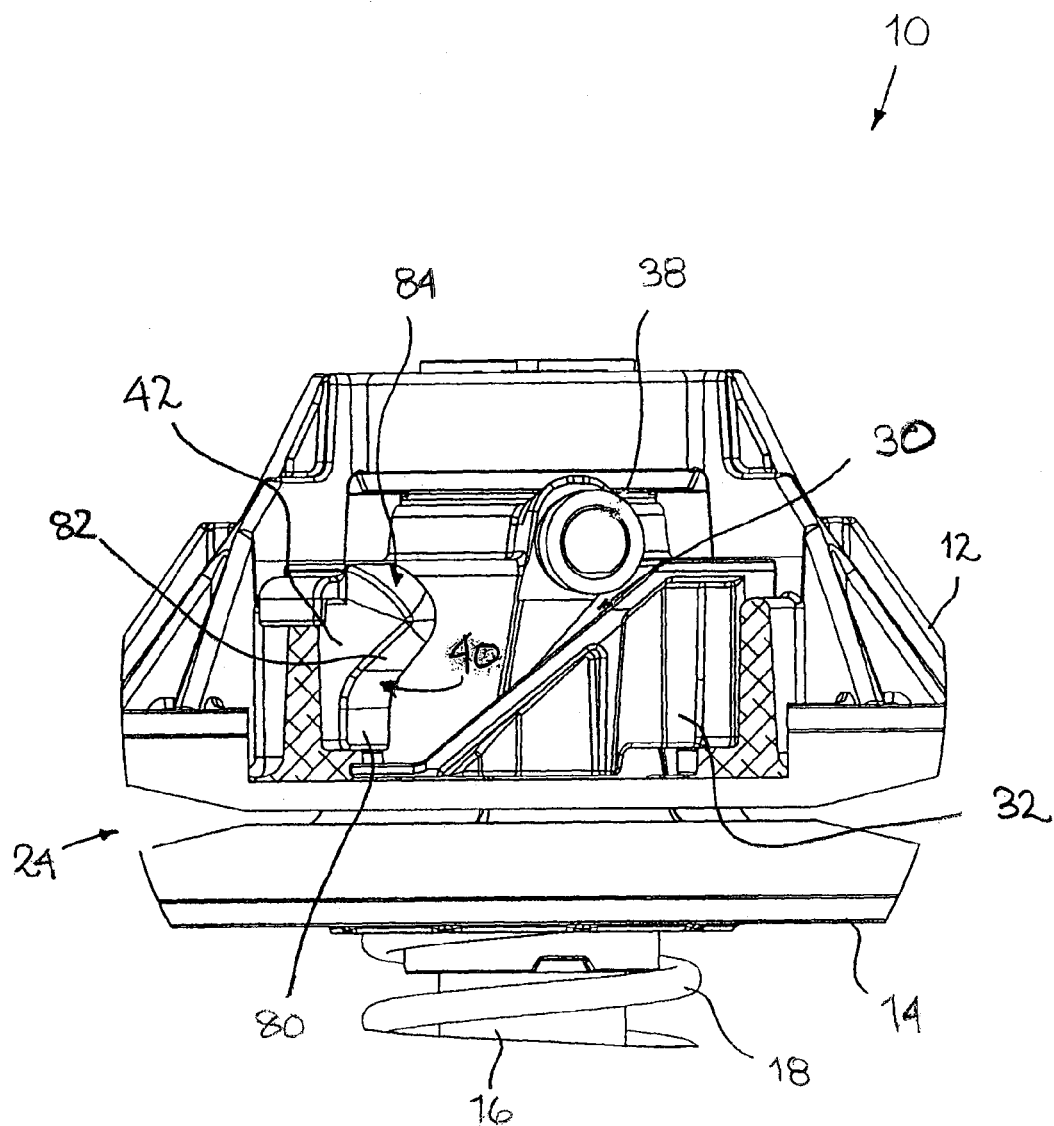
FIG. 8 is a side view of the driven pulley of FIG. 1, once assembled, and that is shown in a forward mode at a minimum ratio.
Figure 9:
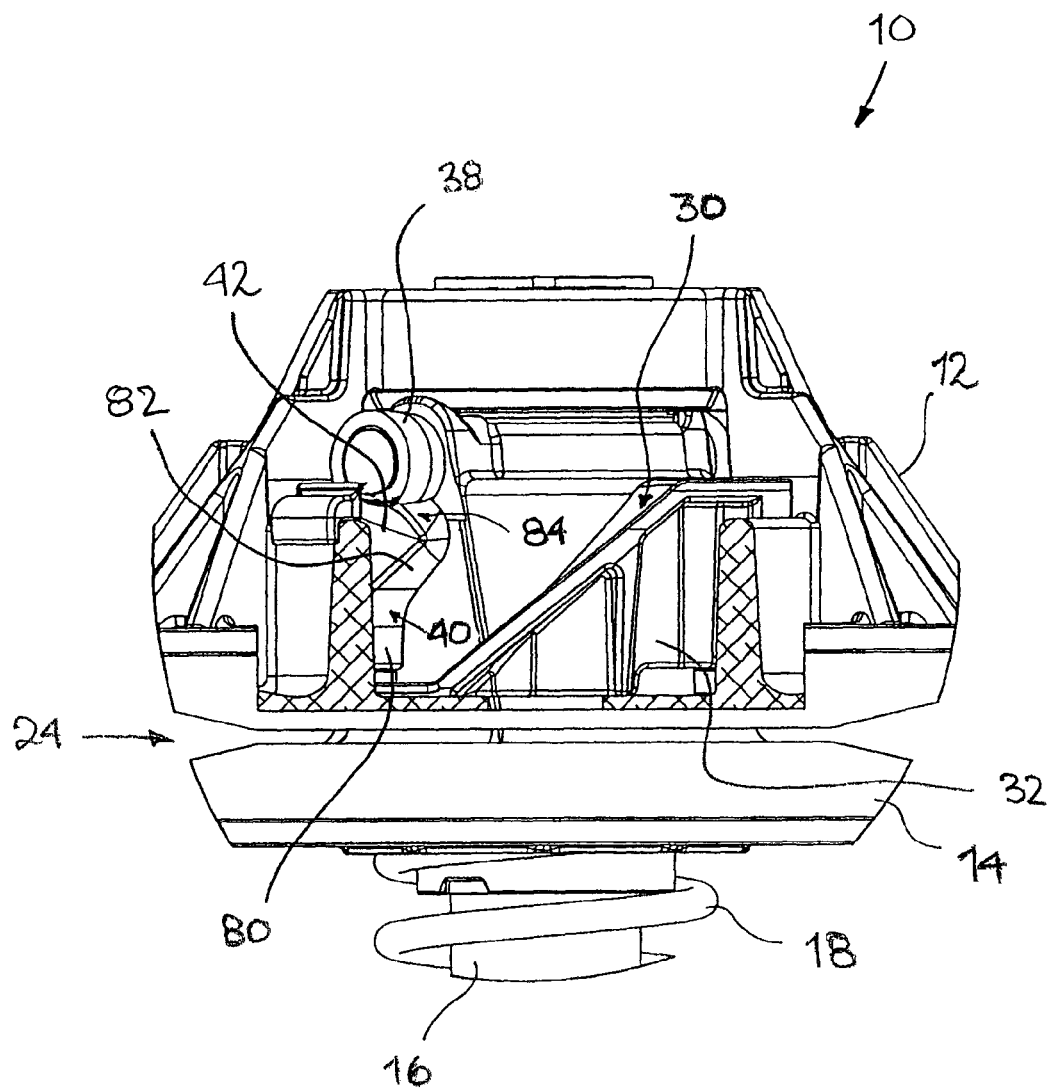
FIG. 9 is a view similar to FIG. 8, showing the driven pulley in a reverse mode at a minimum ration or in a motor braking mode at a low vehicle speed.

The driven pulley 10 comprises a first sheave 12 and a second sheave 14. The first sheave 12 of the illustrated example is designed to be rigidly connected to an output shaft (not shown) through a mounting tube 16 while the second sheave 14 is designed to move with reference to the first sheave 12. The second sheave 14 is slidingly mounted around the mounting tube 16 and a pre-loaded spring 18 urges the second sheave 14 toward the first sheave 12. The two sheaves 12, 14 are coaxial and have respective walls 20, 22 facing each other. The sheaves 12, 14 define between them a belt-receiving groove 24 when they are assembled together, as shown in FIGS. 8 and 9. A spacer 26 can be provided between the first sheave 12 and the second sheave 14 to adjust the minimum spacing, as shown in FIG. 1.

Figure 2:
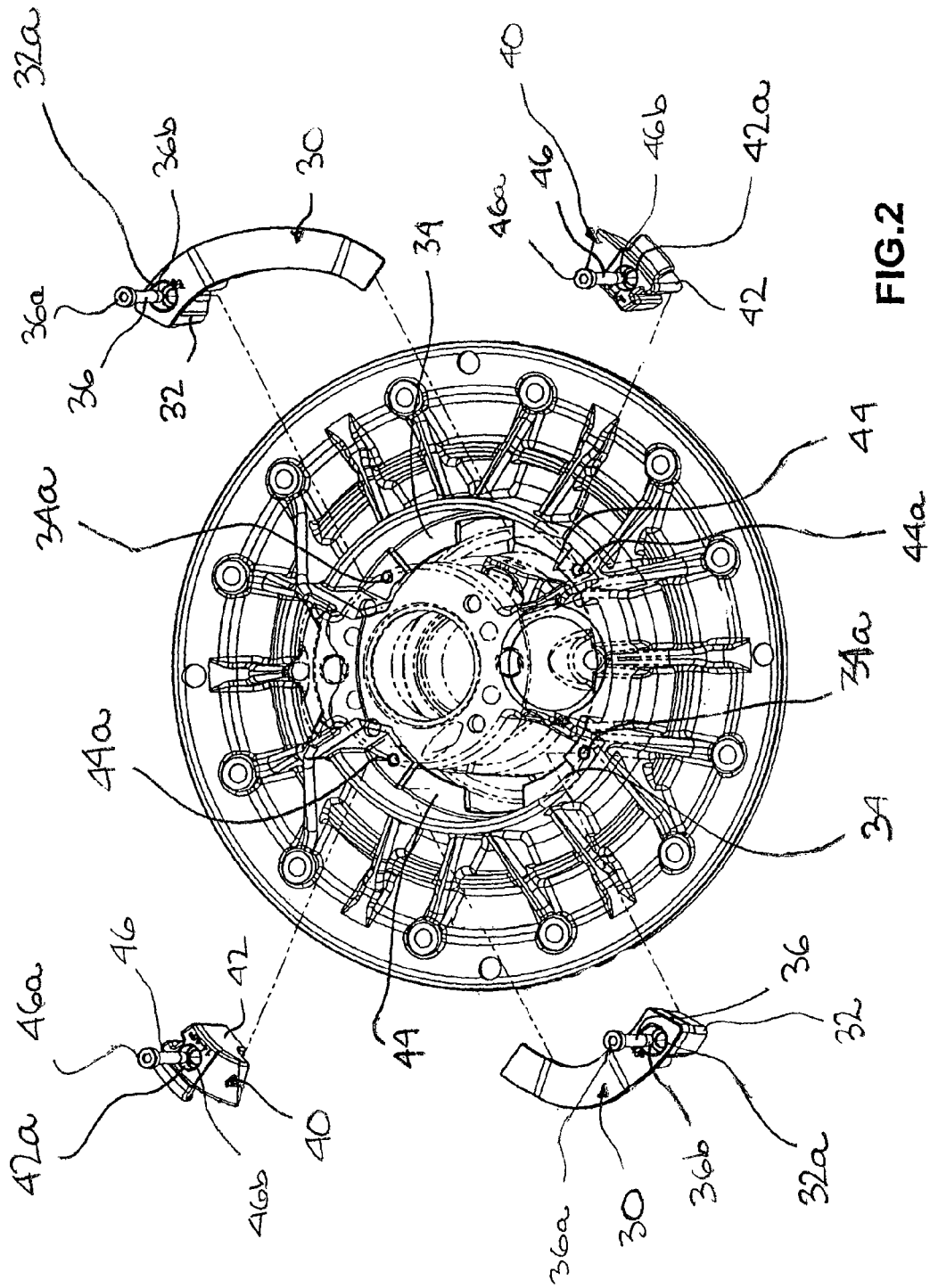
FIG. 2 is a partially exploded isometric view of the first sheave of the driven pulley shown in FIG. 1.

As can be seen from FIGS. 1 and 2, the first sheave 12 comprises two axisymmetric helical ramp surfaces 30 that are integrally formed on corresponding ramp holders 32. The ramp holders 32 are independent from the first sheave 12, which means that they are manufactured separately from the first sheave 12 and that are connected to the first sheave 12 at a later stage of the assembly of the driven pulley 10 or during the useful life thereof. As best shown in FIG. 2, the ramp holders 32 are designed to be inserted in corresponding ramp holder slots 34 provided within the first sheave 12 and are each held in place by at least one fastener, such as a removable fastener, which fasteners is a bolt 36 in the illustrated example. It is also possible to use rivets or other kinds of fasteners instead of the bolts 36, including non-easily removable fasteners or even permanent fasteners, such as welding or the like.

As can be appreciated, providing the ramp surfaces 30 on independent ramp holders 32 can make it very easy to modify the settings of the driven pulley 10 without having to redesign or machine the whole first sheave 12. This way, a same driven pulley model can be used in many different situations with only a few modifications.

The illustrated driven pulley 10 being a reversible driven pulley, it comprises a set of second ramp surfaces 40 that are also integrally formed on corresponding ramp holders 42. Each second ramp surface 40 forms a pair with a corresponding one of the first ramp surfaces 30. The number of pairs of ramp surfaces 30, 40 and the number of followers are equal in the illustrated example, the followers being rollers 38. Each ramp holder 42 is designed to be inserted in a corresponding ramp holder slot 44 of the first sheave 12 and is also held in place by a fastener, which fastener is a bolt 46 in the illustrated example. Rivets or other kinds of fasteners can be used as well, as aforesaid.

The first sheave 12 can be constructed and designed so as to accommodate alternative models of ramp surfaces 30, 40 for operating the driven pulley 10 in any rotational direction. For instance, one can replace the illustrated ramp surfaces 30, 40 with ramp surfaces that are mirror images thereof. The ramp surfaces 30, 40 of the selected model or models are then connected to the first sheave 12 of the driven pulley 10 while the ramp surfaces 30, 40 of the other model or models will not be used in the same driven pulley 10. This way, a designer can use a majority of the same parts of the driven pulley 10 regardless of the rotational direction. Thus, the total number of different parts to manufacture is reduced to a minimum and designers can still be able to match a very wide range of design requirements by changing only the ramp surfaces and their ramp holders, and possibly other parts such as the followers and the spring, if applicable. The slots 34, 44 can be identical so as to receive either the ramp holders 32 or the ramp holders 42.

Furthermore, one can design the driven pulley 10 so that one set or both sets of ramp holders 32, 42 can be replaced with new ones through an open side at the back of the first sheave 12, even when the first sheave 12 and the second sheave 14 are assembled together. It can even be possible to replace the ramp holders 32, 42 while the driven pulley 10 is still mounted in a vehicle, provided that the open side of the first sheave 12 is not blocked by surrounding parts of the vehicle or mounted to the vehicle.

In the illustrated example, as shown in FIG. 2, each bolt 36, 46 has an enlarged tool-engaging head 36a, 46a at one end and a threaded end 36b, 46b at an end that is opposite their head 36a, 46a. The bolts 36, 46 are inserted through a corresponding hole in the ramp holders 32, 42, which hole is made where the ramp surfaces 30, 40 have a maximum height. Their threaded ends 36b, 46b can then be connected to corresponding threaded holes 34a, 44a of the slots 34, 44 of the first sheave 12. Once in place, each bolt 36, 46 extends substantially parallel to the rotation axis of the driven pulley 10. The heads 36a, 46a of the bolts 36, 46 can be hidden within a corresponding chamfered hole 32a, 42a, as shown. If desired, more than one bolt 36, 46 can be used for securing each ramp holder 32, 42.

As can be appreciated, the settings of the driven pulley 10 can be modified by removing ramp holders 32, 42 from the first sheave 12 and by inserting new ramp holders 32, 42 that have a ramp surface 30, 40 different in shape compared to the ramp surface 30, 40 they replace. Such modification can be done at a design stage, or at a later stage. One can choose to modify only one set of ramp surfaces 30, 40 if two set of ramp surfaces 30, 40 are used. The "new" ramp surfaces 30, 40 can also be on the former ramp holders 32, 42, which ramps holder have been modified using tools or other methods.

Figure 3:
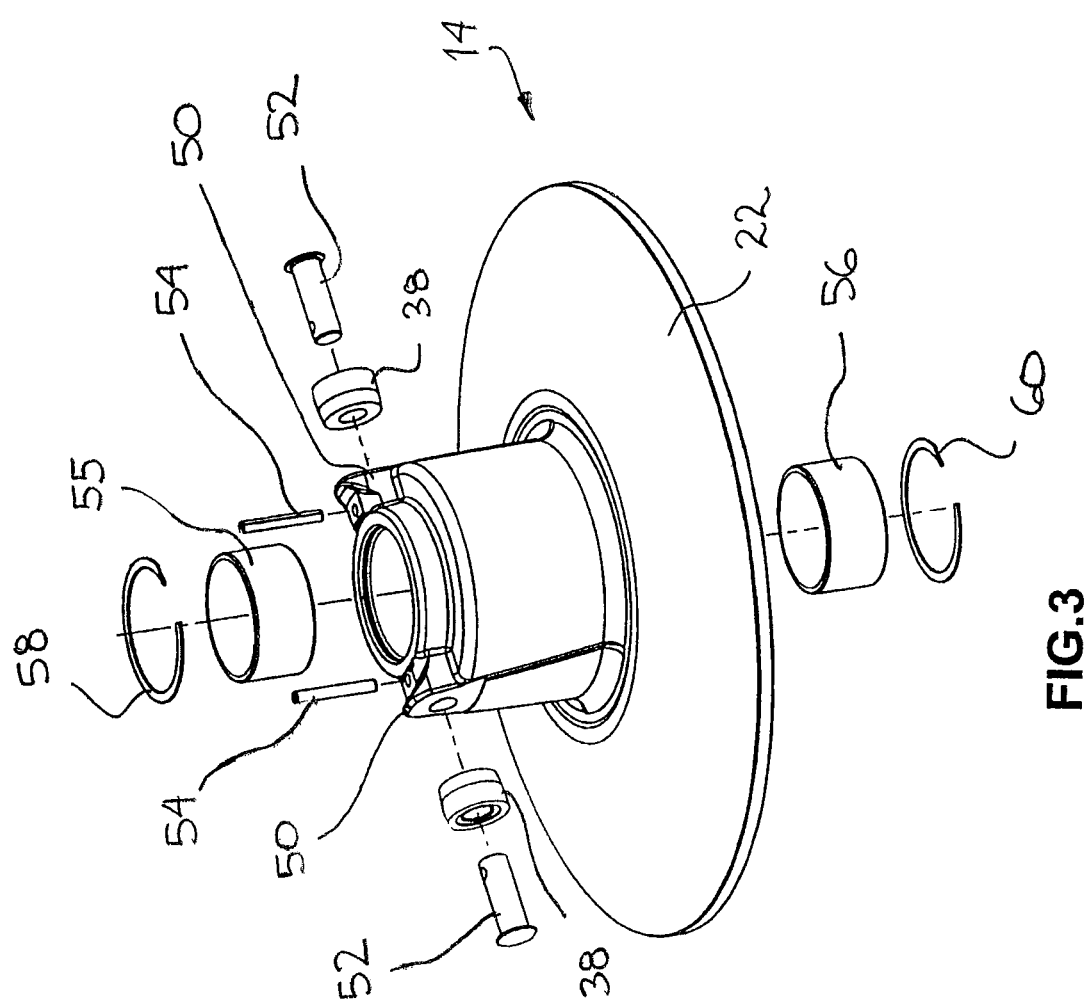
FIG. 3 is an exploded view of the second sheave of the driven pulley shown in FIG. 1.

FIG. 3 shows an exploded view of the second sheave 14 in FIG. 1. The rollers 38 of the illustrated example are removably connected to mounting supports 50 provided on the second sheave 14. Each roller 38 is mounted around a corresponding axle 52 locked in place using a pin 54. Each roller 38 may comprise a built-in bearing (not shown). FIG. 3 also shows bushings 55, 56 that can be provided on the interior side of the second sheave 14 to reduce friction when the second sheave 14 moves on the mounting tube 16. The bushings 55, 56 are held in place by C-clips 58, 60, respectively. Other kinds of fasteners and/or mounting arrangements can be used as well.

It should be noted that each roller 38 can include a damping element (not shown) somewhere between its axle 52 and the surface thereof. The rollers 38 can also be made of a plastic material. All this, either alone or in combination, and the fact the space between each first ramp surface 30 and its corresponding second ramp surface 40 can be relatively small, mitigate the impact noise generated by a rapid transition of the rollers 38 between one set of ramp surfaces to the other.

Figure 4:
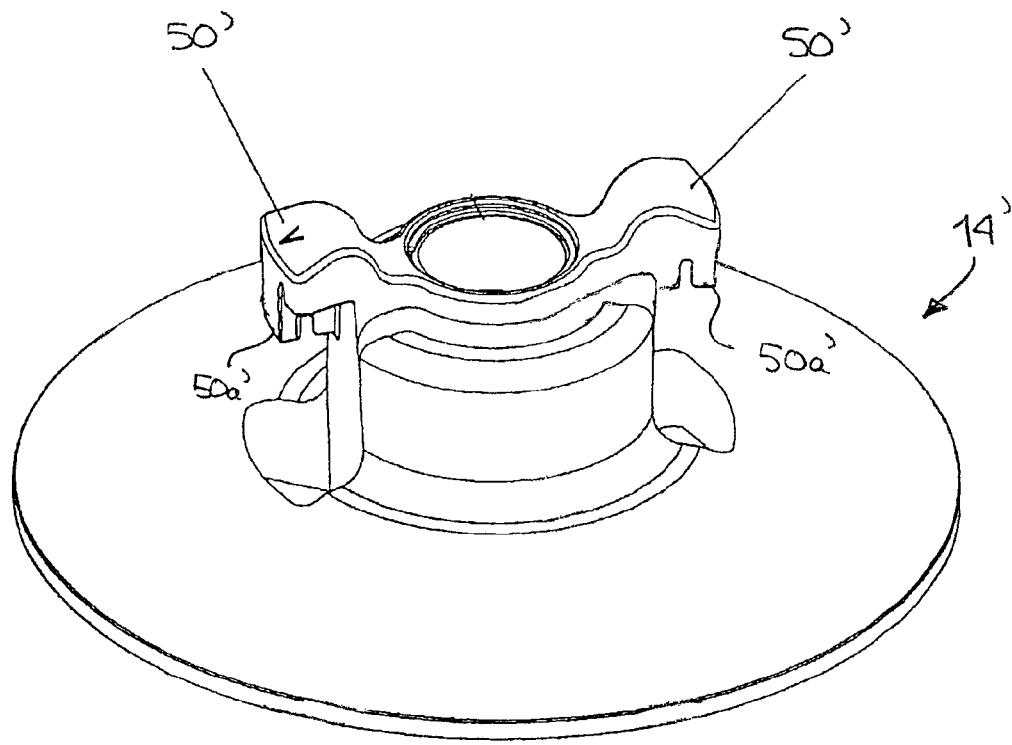
FIG. 4 is an isometric view showing another example of a second sheave that can be used in a driven pulley as improved.

FIG. 4 shows an alternative example of a second sheave 14' that can be used in a driven pulley as improved. This second sheave 14' is used with followers that are sliding buttons, for instance double-sided sliding buttons like the one shown in FIG. 5. Each side of the double-side sliding button 38' is configured and disposed to engage a corresponding one among the first and second ramp surfaces 30, 40. The two sides are not necessarily identical in shape, as shown. The second sheave 14' in FIG. 4 comprises mounting supports 50' that are symmetrically disposed thereon. Each mounting support 50' projects radially and comprises a clamp 50a' where the corresponding double-sided sliding button 38' is installed. A screw or another retaining element (not shown) can be used to attach the double-sided sliding button 38' under its corresponding mounting support 50'. Such fastener can be inserted through the bridge member 38a' that connects the two sides of the double-sided sliding button 38'. Other arrangements can be used as well.

Figure 5:
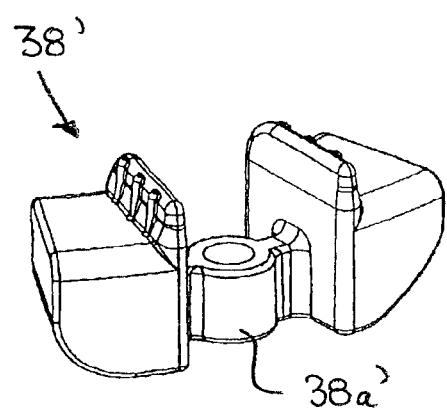
FIG. 5 is an isometric view showing an example of a double-sided sliding button that can be provided on the second sheave in FIG. 4.

It should be noted that it is possible to use double-sided sliding buttons that are different from the one shown in FIG. 5, or to use single-sided sliding buttons. It is also possible to design sliding buttons for a driven pulley that is not a reversible driven pulley. Furthermore, it is also possible to design a driven pulley with rollers for the first ramp surfaces 30 and sliding buttons for the second ramp surfaces 40, or vice-versa. Still, other arrangements are possible as well.

Figures 6, 7:
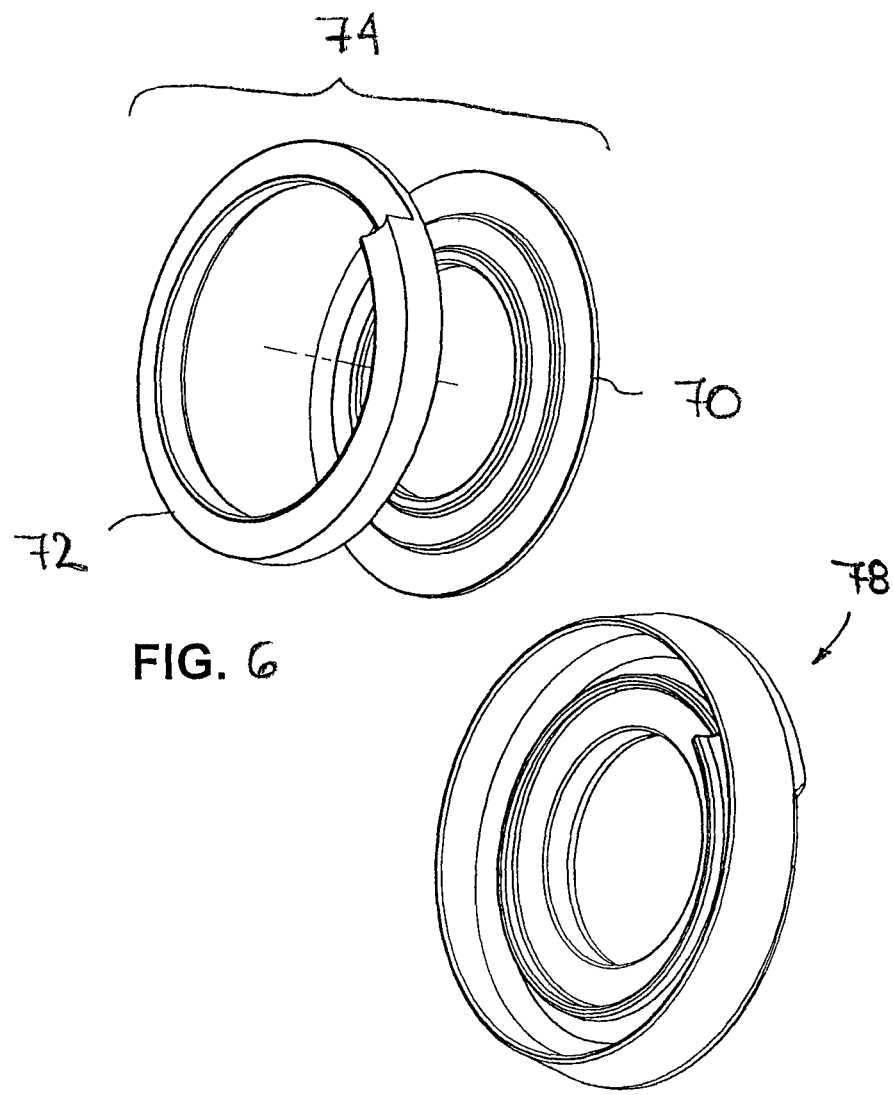
FIG. 6 is an exploded isometric view of an example of a stop and of a spring protector.
FIG. 7 is an isometric view of an example of a one-piece protector that can replace the parts shown in FIG. 6.

FIG. 6 is an isometric view of a stop 70 and of a spring protector 72 that are also shown in FIG. 1. The stop 70 and the spring protector 72 form an assembly 74. These parts are provided in the illustrated example to attach one end of the spring 18 to an end of the mounting tube 16. Referring back to FIG. 1, one end of the spring 18 is set inside the second sheave 14 while an opposite end rests on the assembly 74. The spring protector 72 can be made of plastic while the stop 70 can be made of metal, for instance. Other materials are possible as well. A C-clip 76 holds the assembly 74 on the end of the mounting tube 16. It is also possible to use another kind of fastener instead of the C-clip 76. Alternatively, as shown in FIG. 7, a one-piece member 78 can be provided instead of the assembly 74. The one-piece member 78 integrates the functions of both the stop 70 and the spring protector 72.

In use, during a forward mode, the torque coming from the motor is transmitted to the driven pulley 10 so as to accelerate the vehicle in a forward direction. The driven pulley 10 is then as shown in FIG. 8. FIG. 8 shows the assembled driven pulley 10 as it would appear in a forward mode and at a minimum ratio. The roller 38 engages the first ramp surface 30, thereby providing a torque-transmitting engagement between the first sheave 12 and the second sheave 14.

When the torque provided by the motor decreases or is interrupted, for instance by releasing the gas lever or pedal, the torque provided on the driven pulley 10 can become inverted and the second sheave 14 can be forced to pivot relative to the first sheave 12 if the spring 18 cannot counteract the inverted torque alone, thereby bringing the CVT toward a motor braking mode. At one point, the rollers 38 may engage the second ramp surfaces 40. The role of the second ramp surfaces 40 then depends on design requirements, the ratio of the CVT and the mode of operation. For instance, the second ramp surfaces 40 can be used to prevent the CVT from downshifting too rapidly during a motor braking mode at a moderate or high vehicle speed.

As best shown in FIGS. 8 and 9, the second ramp surface 40 of the illustrated example comprises sections 80, 82, 84 merged end to end so as to form an uninterrupted surface for the roller 38. The first section 80 is substantially axially-extending with reference to the rotation axis of the driven pulley 10 and is positioned to be engaged by the roller 38 during a motor brake mode at the maximum or near the maximum ratio. The second section 82 is generally oriented in a direction that is parallel to the corresponding adjacent first ramp surface 30. The second section 82 is provided to prevent the CVT from downshifting during the deceleration of the vehicle at a moderate speed. The junction between the first section 80 and the second section 82 is rounded.

The third section 84 is oriented in a direction that is generally perpendicular to that of the second section 82.

When the vehicle further decelerates up to a point where the torque coming from the wheels or track toward the motor is low and the motor rotation speed is low, the roller 38 is allowed to move up the third section 84, passing over the wedge-shaped junction between the second section 82 and third section 84. The CVT will downshift much faster with the roller 38 on the third section 84 since the inverted torque will force the driven pulley 10 towards the minimum ratio.

The third section 84 is also designed to be engaged by the roller 38 when the driven pulley 10 is in a reverse mode, which reverse mode is carried out with the ratio being minimum or near the minimum ratio. With the third section 84, the driven pulley 10 cannot force the CVT to upshift when the vehicle is in a reverse mode and the CVT can even be forced to downshift if it is not already at the minimum ratio, thereby increasing the gripping force of the driven pulley 10 on the drivebelt. Such configuration is very useful in a driven pulley of a CVT connected to a motor having a bidirectional torque input, particularly if the vehicle may require a relatively high torque for backing-up. This may be the case of a vehicle that needs to get out of a ditch or move up a steep hill backwards. The torque required from the motor to the wheels or tracks can be relatively high in these circumstances. The challenge with a conventional reversible driven pulley in the same situation is that such conventional pulley may force the whole CVT to upshift as soon as the torque coming from the motor in a reverse mode increases, thereby ultimately preventing the vehicle from moving. FIG. 9 shows the driven pulley 10 as it would appear in a reverse mode at a minimum ratio. FIG. 9 also shows the driven pulley 10 as it would appear during a motor-braking mode at a low vehicle speed (or low ratio).

It must be understood that the improvements presented herein are not limited to illustrated example and that various changes and modifications may be effected therein. For instance, the exact shape of the driven pulley and any individual parts thereof can vary, depending on the needs. It is possible to use more than two ramp surfaces of each set. If desired, less than all the ramp surfaces can be provided on ramp holders that are independent from the first sheave. For instance, one can design a driven pulley with only the second ramp surfaces being provided on ramp holders, while the first ramp surfaces are made integral with the first sheave, or vice-versa. It is possible to design a driven pulley with combined ramp holders, each ramp holder having a first ramp surface at one end and a second ramp surface at an opposite end. Still, it is possible to design a driven pulley in which the relative position of the ramp surfaces and of the followers would be inverted compared to what is shown in the figures, the followers being connected to the sheave that is attached to the output shaft and the ramp surfaces being connected to the sheave that is movable with reference to the other sheave.

The invention claimed is:

1. A driven pulley for a continuously-variable transmission, the driven pulley having a rotation axis and comprising:
    two coaxially-disposed sheaves, each sheave having an interior surface and an exterior surface opposite the interior surface, the interior surfaces defining between them a belt-receiving groove;
    at least two axisymmetric ramp surfaces attached to one of the sheaves and facing away from the two sheaves; and
    at least two axisymmetric followers attached to the other sheave and positionable outside the exterior surface of said one of the sheaves, each ramp surface being engageable by a corresponding one of the followers; wherein
    at least two of the ramp surfaces are each provided on a top side of a corresponding separate ramp holder that is individually and removeably connected to said one of the sheaves, each of the separate ramp holders having a bottom side, opposite the top side, located in and in engagement with a corresponding ramp holder slot provided on the exterior surface of said one of the sheaves.

2. The driven pulley as defined in claim 1, wherein the ramp holders, once connected to said one of the sheaves, are immovable relative to said one of the sheaves.

3. The driven pulley as defined in claim 1, wherein each ramp holder slot is provided on a back side of a wall of said one of the sheaves, the wall having a front side, opposite the back side, defining one edge of the belt-receiving groove of the driven pulley.

4. The driven pulley as defined in claim 1, wherein each ramp holder is removeably connected to said one of the sheaves using a single fastener, each fastener comprising a threaded portion and said one of the sheaves comprising a corresponding threaded portion located in the corresponding ramp holder slot to receive the threaded portion of the fastener.

5. The driven pulley as defined in claim 4, wherein each threaded portion of said one of the sheaves longitudinally extends in a direction that is substantially parallel to the rotation axis of the driven pulley.

6. The driven pulley as defined in claim 5, wherein the fasteners are inserted through corresponding holes made across the ramp holders where a ramp surface height between the top and bottom sides of each ramp holder is substantially maximum.

7. The driven pulley as defined in claim 6, wherein each fastener has an enlarged tool-engaging head, the heads of the fasteners being hidden inside corresponding chamfered hole sections once the ramp holders are connected to said one of said sheaves.

8. The driven pulley as defined in claim 1, wherein the ramp holders are individually removable from the driven pulley even when the two sheaves of the driven pulley are connected together.

9. The driven pulley as defined in claim 1, wherein the ramp surfaces are at least four in number and are all provided on a corresponding one of the ramp holders, the ramp surfaces comprising first ramp surfaces and second ramp surfaces in equal number, each first ramp surface being engageable by one of the followers while the followers are out of engagement with the second ramp surfaces, each second ramp surfaces being engageable by one of the followers when the followers are out of engagement with the first ramp surfaces.

10. The driven pulley as defined in claim 9, wherein each first ramp surface and a corresponding one of the second ramp surfaces are alternatively engageable by the same corresponding follower.

11. The driven pulley as defined in claim 9, wherein each first ramp surface and each second ramp surface are engageable by a different one of the followers, each follower being engageable with only one of the ramp surfaces.

12. The driven pulley as defined in claim 9, wherein each second ramp surface comprises:
    a first section substantially axially extending with reference to the rotation axis of the driven pulley;
    a second section extending in a direction that is generally parallel to a corresponding adjacent one of the first ramp surfaces; and
    a third section extending in a direction that is generally perpendicular to the second section, the third section being engageable by a corresponding one of the followers to prevent the continuously-variable transmission from upshifting when operated in a reverse mode.

13. The driven pulley as defined in claim 12, wherein the second section of each second ramp surface has one end merging with a corresponding end of the first section, the second section having a second end, opposite the first end, merging with a corresponding end of the third section, the three sections being substantially continuous.

14. The driven pulley as defined in claim 1, wherein the ramp holder slots receive the bottom side of the ramp holders regardless of a direction of rotation of the driven pulley corresponding to a forward mode of the continuously-variable transmission.

15. A method of modifying settings of a driven pulley of a continuously-variable transmission, the method comprising:
    removing a plurality of individual ramp holders that are each separately and individually connected to an exterior surface of a sheave of the driven pulley, each individual ramp holder having a bottom side engaging the exterior surface of the sheave and having a top side opposite the bottom side, the bottom side of each individual ramp holder being located inside a corresponding ramp holder slot provided on the exterior surface of the sheave, the top side of each individual ramp holder facing away from the exterior surface of the sheave and including a corresponding ramp surface configured to engage a corresponding follower; and then inserting a plurality of new individual ramp holders into the corresponding ramp holder slots on the exterior surface of the sheave of the driven pulley and connecting them to the sheave, the new individual ramp holders having ramp surfaces that are different in shape compared to the ramp surfaces they replace.

16. The method as defined in claim 15, wherein the step of removing includes removing a single fastener to remove each ramp holder from the corresponding ramp holder slot.

17. The method as defined in claim 15, wherein the step of removing and the step of inserting are carried out while the sheave of the driven pulley is connected to another sheave of the driven pulley.

18. The method as defined in claim 15, wherein the step of removing and the step of inserting are carried out while the sheave of the driven pulley is connected to another sheave of the driven pulley and the driven pulley is mounted in a vehicle.

* * * * *